(12) United States Patent
Czarnecki

(10) Patent No.: US 11,255,691 B2
(45) Date of Patent: Feb. 22, 2022

(54) METHOD FOR PROVIDING LOCATION-BASED SERVICE AND ELECTRONIC DEVICE THEREFOR

(71) Applicant: Samsung Electronics Co., Ltd, Suwon-si (KR)

(72) Inventor: Piotr Czarnecki, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 219 days.

(21) Appl. No.: 16/494,244

(22) PCT Filed: Mar. 14, 2018

(86) PCT No.: PCT/KR2018/002963
§ 371 (c)(1),
(2) Date: Sep. 13, 2019

(87) PCT Pub. No.: WO2018/169295
PCT Pub. Date: Sep. 20, 2018

(65) Prior Publication Data
US 2020/0132501 A1  Apr. 30, 2020

(30) Foreign Application Priority Data
Mar. 14, 2017  (KR) .................. 10-2017-0031960

(51) Int. Cl.
*G01C 21/36* (2006.01)
*G06F 16/29* (2019.01)
*G01C 21/34* (2006.01)

(52) U.S. Cl.
CPC ..... *G01C 21/3682* (2013.01); *G01C 21/3476* (2013.01); *G01C 21/3617* (2013.01); *G01C 21/3673* (2013.01); *G06F 16/29* (2019.01)

(58) Field of Classification Search
CPC ............ G01C 21/3641; G01C 21/3476; G01C 21/3644; G06Q 30/0261
See application file for complete search history.

(56) References Cited

U.S. PATENT DOCUMENTS 7,480,567 B2  1/2009  Suomela et al.
7,822,426 B1 * 10/2010  Wuersch .......... G01C 21/20
                                                      455/456.1

(Continued)

FOREIGN PATENT DOCUMENTS

| KR | 10-1350227 B1 | 1/2014 |
| WO | 2013/180812 A1 | 12/2013 |
| WO | 2014/077500 A1 | 5/2014 |

OTHER PUBLICATIONS

Supplementary European Search Report dated Jan. 31, 2020 in connection with European Patent Application No. 18 76 7295, 9 pages.

(Continued)

*Primary Examiner* — Thomas G Black
*Assistant Examiner* — Ana D Thomas

(57) ABSTRACT

Disclosed is a location-based service based on a user point of interest (POI). An electronic device comprises: a processor for generating a database related to a user POI; detecting the user request for information; and an output unit for outputting information based on the user POI database. The user POI can indicate at least one place extracted from the information inputted to the electronic device.

20 Claims, 17 Drawing Sheets

(56) References Cited

U.S. PATENT DOCUMENTS

| | | | | |
|---|---|---|---|---|
| 8,135,505 | B2* | 3/2012 | Vengroff | H04W 4/024 701/24 |
| 8,386,488 | B2* | 2/2013 | Jones | G06F 16/285 707/738 |
| 8,589,069 | B1* | 11/2013 | Lehman | H04W 4/029 701/438 |
| 8,754,777 | B1* | 6/2014 | Mendis | G01C 21/3484 340/636.1 |
| 8,782,034 | B1* | 7/2014 | Moczydlowski | G06F 16/9535 707/713 |
| 2006/0069503 | A1* | 3/2006 | Suomela | G01C 21/3641 701/431 |
| 2007/0078596 | A1* | 4/2007 | Grace | G06Q 30/0265 701/533 |
| 2008/0027633 | A1* | 1/2008 | Obradovich | G06Q 30/02 701/532 |
| 2012/0197714 | A1* | 8/2012 | Beyeler | G01C 21/367 705/14.49 |
| 2015/0312409 | A1* | 10/2015 | Czarnecki | H04M 3/42093 455/414.1 |
| 2016/0047661 | A1* | 2/2016 | Yeo | G01C 21/3644 701/430 |
| 2017/0006430 | A1* | 1/2017 | Chao | G06Q 30/0261 |

OTHER PUBLICATIONS

Communication pursuant to Article 94(3) EPC dated Oct. 1, 2020 in connection with European Application No. 18767295.1, 12 pages.

Donnie H. Kim et al., "Discovering Semantically Meaningful Places from Pervasive RF-Beacons", Proceedings of the 11th international conference on Ubiquitous computing, Sep. 30-Oct. 3, 2009, 10 pages.

Wenwen Li et al., "Geospatial Data Mining on the Web: Discovering Locations of Emergency Service Facilities", Advanced Data Mining and Applications, 2012, 12 pages.

Cody Toombs, "Google Maps is testing landmarks in navigation instructions, v9.76 beta prepares support for community-added events [APK Teardown]", Apr. 18, 2018, 5 pages.

Trusted Reviews, "Google Maps tests landmark-based navigation over street name directions", Apr. 18, 2018, 1 page.

Pawel Wilk et al., "Indoor Radio Map Maintenance by Automatic Annotation of Crowdsoured Wi-Fi Fingerprints", 2015 International Conference on Indoor Positioning and Indoor Navigation (IPIN), Oct. 2015, 8 pages.

Dongyoun Shin et al., "Urban Sensing: Using Smartphones for Transportation Mode Classification", Computers, Environment and Urban Systems, vol. 53, Sep. 2015, 9 pages.

International Search Report dated Jun. 18, 2018 in connection with International Patent Application No. PCT/KR2018/002963, 2 pages.

Written Opinion of the International Searching Authority dated Jun. 18, 2018 in connection with International Patent Application No. PCT/KR2018/002963, 7 pages.

Korean Intellectual Property Office, "Notice of Preliminary Rejection" dated Apr. 14, 2021, in connection with Korean Patent Application No. 10-2017-0031960, 11 pages.

Notice of Patent Grant dated Jul. 24, 2021, in connection with Korean Patent Application No. 10-2017-0031960, 3 pages.

* cited by examiner

METHOD FOR PROVIDING LOCATION-BASED SERVICE AND ELECTRONIC DEVICE THEREFOR

CROSS-REFERENCE TO RELATED APPLICATIONS

This application is a 371 of International Application No. PCT/KR2018/002963 filed on Mar. 14, 2018, which claims priority to Korean Patent Application No. 10-2017-0031960 filed on Mar. 14, 2017, the disclosures of which are herein incorporated by reference in their entirety.

BACKGROUND

1. Field

The present disclosure generally relates to an electronic device, and more specifically, to a method for providing a location-based service and an electronic device thereof.

2. Description of Related Art

Thanks to remarkable development of information communication technology and semiconductor technology, supply and use of various electronic devices are rapidly increasing. As the electronic device is widely supplied, the electronic device supports various functions. For example, the electronic device may receive information of a location of the electronic device from a global positioning system (GPS) satellite. The electronic device may provide information of the location of the electronic device to a user. In addition, the electronic device supports various services such as a map service or a navigation service using the location information of the electronic device.

SUMMARY

Based on the discussions described above, the present disclosure provides a method and an apparatus for providing point of interest (POI) information based on user experience.

In addition, the present disclosure provides a method and an apparatus for providing information of a place description based on a user POI.

In addition, the present disclosure provides a method and an apparatus for providing navigation information based on a user POI.

In addition, the present disclosure provides a method and an apparatus for displaying a map based on a user POI.

In addition, the present disclosure provides a method and an apparatus for providing recommendation information based on a user POI.

In addition, the present disclosure provides a method and an apparatus for acquiring place information based on wifi monitoring.

According to various embodiments of the present disclosure, an electronic device may include a processor configured to generate a database relating to a user point of interest (POI), and detect an information request from a user, and an output unit for outputting information based on the database, and the user POI may indicate at least one place extracted from information inputted to the electronic device.

According to various embodiments of the present disclosure, an operating method of an electronic device may include generating a database relating to a user POI, detecting an information request from a user, and outputting information based on the database, and the user POI may indicate at least one place extracted from information inputted to the electronic device.

A method and an electronic device according to various embodiments of the present disclosure may, by filtering location and place information based on a user point of interest (POI), provide POI information of a more appropriate form to a user, and thus, the user of the electronic device may improve cognitive ability and cognitive speed on a geographical place.

Effects obtainable from the present disclosure are not limited to the above mentioned effects, and other effects which are not mentioned may be clearly understood by those skilled in the art of the present disclosure through the following descriptions.

DETAILED DESCRIPTION

Figure 1:
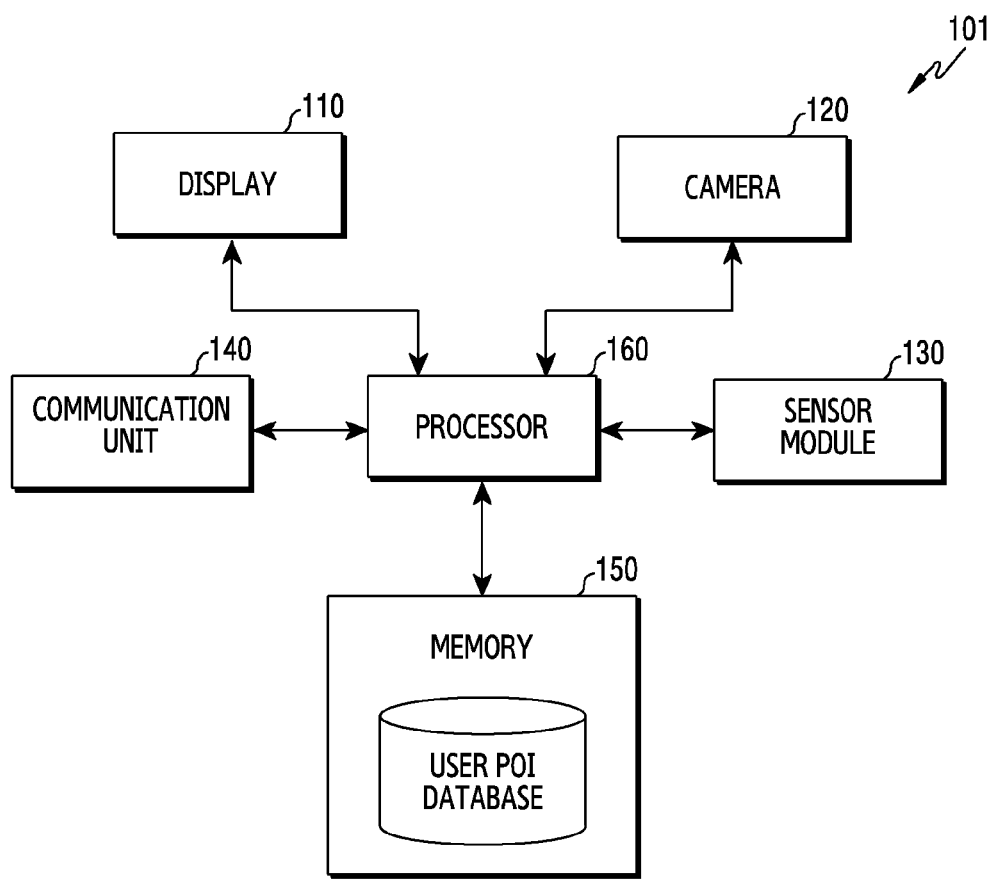
FIG. 1 illustrates a functional configuration of an electronic device according to various embodiments of the present disclosure.

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to a method for providing a location based service in a wireless communication system and an electronic device thereof. More specifically, the present disclosure describes a technique for providing various location based services based on a user point of interest (POI) in the electronic device.

Terms (e.g., POI) indicating places, terms indicating types of a place based service, and terms indicating components of a device which are used in the following descriptions, are for the sake of explanations. Accordingly, the present disclosure is not limited to the terms to be described, and may use other terms having technically identical meaning.

Various embodiments for the location based service are described below. Hereinafter, definitions of terms used in the descriptions are as follows.

'POI' may include information relating to a place corresponding to a location. For example, the POI may include information of the place (e.g., a shop, an institution, facilities or building, etc.) where the electronic device is currently located. 'POI' may further include awareness information (e.g., a business name, an institution name, a facility name, a building name, etc.) for a corresponding place at a recognition level of people.

'User POI' may include a POI relating to a user of the electronic device. That is, the user POI may include information indicating at least one place extracted from information inputted to the electronic device. Herein, 'information' may be variously defined as a GPS reception signal, wireless fidelity (Wi-Fi) media access control (MAC) address and its location information, and information included in a webpage displayable at the electronic device. In addition, 'extract' may be defined as a series of processes for acquiring meaningful information for the user from the inputted information. For example, the electronic device may receive a GPS signal and obtain specific location information. It may obtain place information corresponding to the acquired location. As another example, the electronic device may receive a WiFi MAC address, and obtain place information corresponding to the MAC address. As another example, the electronic device may obtain text from every information included in the webpage, and obtain place information indicated by the text. In short, 'user POI' indicates the POI which is visited, known, or expected to be aware of by the user of the electronic device. Specifically, 'user POI' may be classified into a visited place, a landmark, a common culture recognized place, an interested place of the user of the electronic device, and so on. At this time, the landmark may have a different weight. For example, a world famous place (e.g., the Eiffel Tower, the Statue of Liberty) may have a higher weight, and all of users may know the corresponding place. By contrast, a locally famous place (e.g., Hanok Village, Suncheon Bay) may be a landmark having a low weight. The common cultural recognized place may refer to a place which is known from other users living in the same area, or known by a community newspaper. The interested place may refer to a place which the user may be aware of by reading a television (TV) program, a movie, a drama, and a book. The user visited place may refer to a place where the visit of the electronic device 101 is detected.

'Event' may include information occurring at the POI, wherein the POI may refer to a POI included in a user POI database of the electronic device. Accordingly, 'event' may indicate all information occurring at a place regarding the user of the electronic device.

FIG. 1 illustrates a functional configuration of an electronic device according to various embodiments of the present disclosure. A term such as 'portion' or '~er' used hereafter indicates a unit for processing at least one function or operation, and may be implemented using hardware, software, or a combination of hardware and software.

Referring to FIG. 1, the electronic device 101 may include a display 110, a camera 120, a sensor module 130, a communication unit 140, a memory 150 and a processor 160.

The display 110 is a component for displaying a screen of the electronic device 101. For example, the display 110 may be configured with at least one of organic light emitting diode (OLED), quantum-dot light emitting diode (QLED), and liquid crystal display (LCD). As another example, the display 110 may include a touch screen panel for detecting a user touch input of the electronic device 101.

The camera 120 performs a function for capturing an image of an external environment of the electronic device 101. For example, if a navigation is executed, the camera 120 may capture a road sign. Although not depicted, the camera 120 may include a separate processor (e.g., a graphic process unit (GPU)) for processing the image, and recognize a text of the sign through separate processing on the image acquired by a sensor embedded in the camera 120.

The communication unit 140 performs a function for receiving a signal from an external device or transmitting a signal to the external device. For example, the communication unit 140 may receive a WiFi signal of the external device, and transmit a message notifying that connection is successful.

The memory 150 stores a basic program for operating the electronic device 101, an application program and data such as setting information. Herein, the application program may include a map or navigation application. The memory 150 may be configured with a volatile memory, a non-volatile memory or a combination of a volatile memory and a non-volatile memory. The memory 150 may provide the stored data according to a request of the processor 160. The memory 150 may store location and place information acquired by the communication unit 140 and/or the sensor module 130. Specifically, the memory 150 may store a user's known place database based on text mining and a visited place database based on WiFi monitoring. In addition, the memory 150 may store a map POI database received from a server and data necessary for public transportation detection.

The processor 160 controls entire operations of the electronic device 101. For example, the processor 160 may control the screen display of the display 110, and recognize an external object through the camera 120. As another example, the processor 160 may obtain the location information of the electronic device 101 through the communication unit 140 or the sensor module 130. As another example, the processor 160 may store place information regarding the user in the user POI database. In addition, the processor 160 may generate and output location related information based on the user POI. At this time, the location related information may be outputted through the display 110 in a visual form, and may be outputted through a speaker (not shown) in a sound form. Herein, the display 101 and the speaker which may output the location related information may be commonly referred to as an 'output unit'. According to various embodiments of the present disclosure, the processor 160 may control the electronic device 101 to perform various operations to be described.

Figure 2:
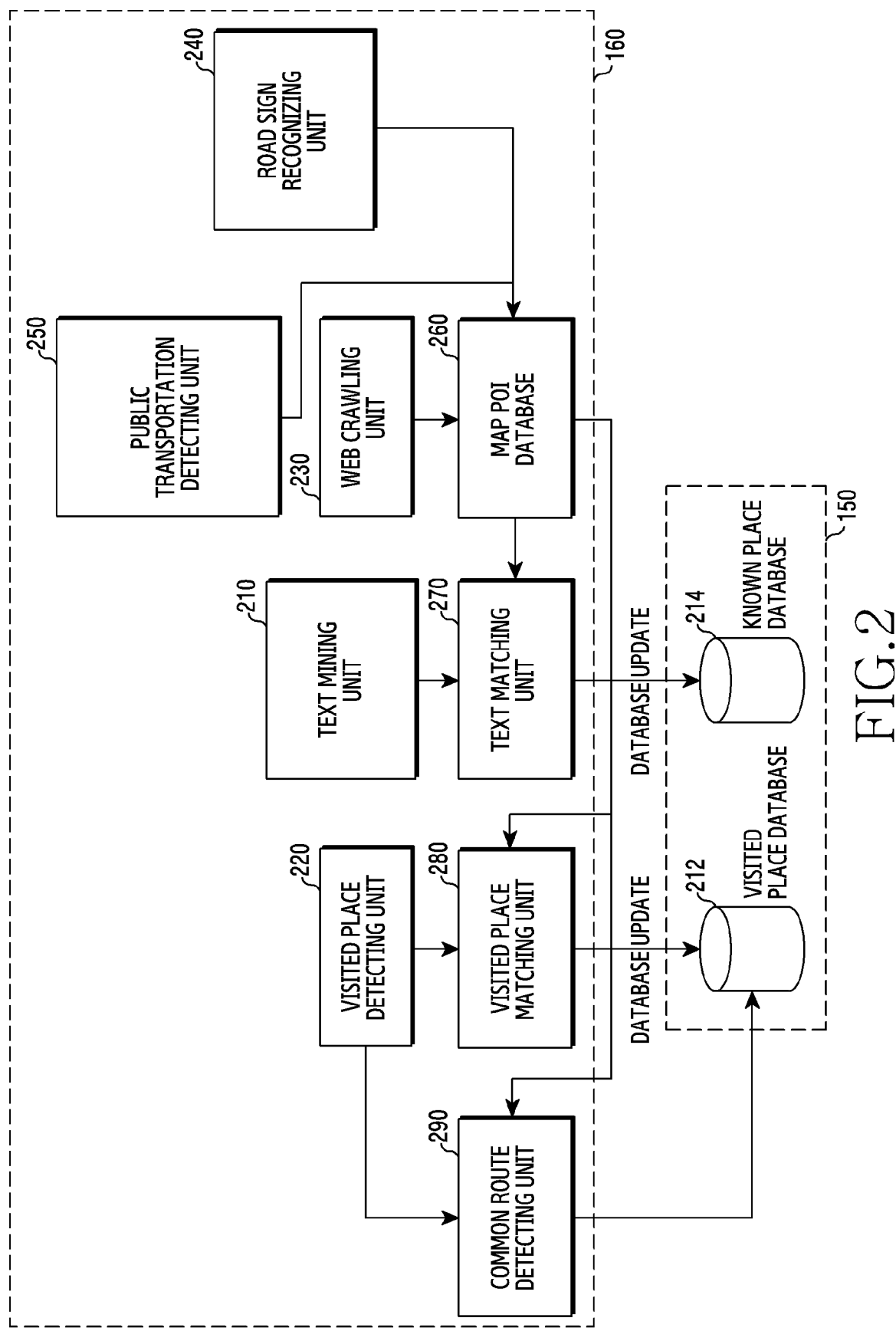
FIG. 2 illustrates a functional block diagram of a processor and a memory according to various embodiments of the present disclosure.

FIG. 2 illustrates a functional block diagram of a processor and a memory according to various embodiments of the present disclosure. A term such as 'portion' or '~er' used hereafter indicates a unit for processing at least one function or operation, and may be implemented using hardware, software, or a combination of hardware and software.

Referring to FIG. 2, the processor 160 of the electronic device 101 may include a text mining unit 210, a visited place detecting unit 220, a web crawling unit 230, a road sign recognizing unit 240, a public transportation detecting unit 250, a map POI database 260, a text matching unit 270, a visited place matching unit 280 and a common route detecting unit 290. Herein, the text mining unit 210, the visited place detecting unit 220, the web crawling unit 230, the road sign recognizing unit 240, the public transportation detecting unit 250, the map POI database 260, the text matching unit 270, the visited place matching unit 280 and the route detecting unit 290 may be, as an instruction set or code stored in the memory 150, the instructions/code resided in the processor 160 at least temporarily or a storage space storing the instructions/code, or part of circuitry of the processor 160.

The text mining unit 210 may detect texts regarding the input and the output of the electronic device 101. For example, the text mining unit 210 may detect every text which is inputted by the user. Specifically, the text mining unit 210 may detect texts completed through every input device such as a touch input. As another example, the text mining unit 210 may detect every text outputted. Specifically, the text mining unit 210 may detect all of the texts displayed on the display 110 of the electronic device 101.

The visited place detecting unit 220 may detect information of a place visited by the electronic device 101. For example, the electronic device 101 may detect the visited place information through a global positioning system (GPS) module, and a wifi positioning system (WPS) module. According to another embodiment, the electronic device 101 may detect the visited place information through a WiFi monitoring unit.

The web crawling unit 230 may randomly collect POI information on web sites. For example, the web crawling unit 230 may acquire POI information from information extracted from every website connected on the electronic device 101.

The road sign recognizing unit 240 may recognize a road sign through the camera 120. For example, if the user executes a navigation application, the electronic device 101 may operate the camera 120, and the electronic device 101 may recognize the road sign, according to the image processing process of the camera 120. As another example, if detecting a speed exceeding a threshold speed, the electronic device 101 may operate a camera and recognize a road sign. As another example, the road sign recognizing unit 240 may include a separate database, and the corresponding database may be received from a server. Herein, the separate database and the server may be provided by a public institution or a third party which provides a road traffic related service.

The public transportation detecting unit 250 may include general information about public transportations, wherein the public transportations may refer to a bus, a subway, a tram and so on. According to another embodiment, the public transportation detecting unit 250 may include a separate database, and the corresponding database may be received from the server. Herein, the separate database and the server may be provided by a public institution or a third party which provides a public transportation related service The map POI database 260 may include all the POI information. For example, if the user downloads and executes a map or navigation application, the electronic device 101 may download and store a database including existing POI information from an external device (e.g., a server). Herein, the existing POI information may be provided by a third party such as an application or service provider, and may be different from actual POI information at the application execution.

The text matching unit 270 may identify whether the text obtained through the text mining unit 210 is a text referring to the POI. For example, the text matching unit 270 may detect the text indicating the POI by comparing the obtained text with a plurality of POI information included in the map POI database 260. According to another embodiment, the electronic device 101 may match the POI text acquired through the text mining with the user POI database, and store in a known place database 214 if the matching is not fulfilled.

The visited place matching unit 280 may identify whether a visited place is the place for the POI. For example, the visited place may be acquired through the visited place detecting unit 220, and the visited place matching unit 280 may determine whether the visited place corresponds to the POI, by comparing the acquired visited place information with the map POI database 260. According to another embodiment, the electronic device 101 may store the POI obtained by the visited place matching unit 280 in a visited place visited place database 212. Herein, if the POI acquired by the visited place matching unit 280 already exists, the electronic device 101 may store a history in the form of a specific user log. In addition, if the POI acquired by the visited place matching unit 280 is not stored in the visited place database 212, the electronic device 101 may store the POI of the visited place. Hence, the electronic device 101 may identify the history of the visited place and a place list.

The common route detecting unit 290 may detect routes between the visited places. For example, if detecting a visit to a specific place, the common route detecting unit 290 may determine common routes between the specific place of the detected visit and other visited places. In another embodiment, the common route detecting unit 290 may determine a plurality of common routes between the same visited places.

The memory 150 of the electronic device 101 may include the visited place database 212 and the known place database 214. Herein, information including all information of the visited place database 212 and the known place database 214 both may be referred to as user POI information.

The visited place database 212 may store POI information visited directly by the user and acquired through the visited place detecting unit 220 of the electronic device 101. In addition, the visited place database 212 may include not only the POI information visited directly by the user, but also the route information acquired by the common route detecting unit 290 between the directly visited places.

The known place database 214 may store POI information recognized by the user through the input and the output and acquired through the text mining unit 210 of the electronic device 101. The POI information stored in the known place database 214 may not be merely the text information acquired by the text mining, but may be specific POI information compared with the map POI database 260 by the text matching unit 270.

In the embodiment as described in reference to FIG. 2, the visited place database 212 and the known place database 214 have been described as part of the configuration of the electronic device 101. However, according to another embodiment, in place of the visited place database 212 and the known place database 214, the electronic device may use a database stored outside. For example, the visited place database 212 and the known place database 214 may be formed in an external server (e.g., a cloud server), and accordingly, the electronic device 101 may access use the information stored in the visited place database 212 and the known place database 214 by accessing the external server.

Figure 3:
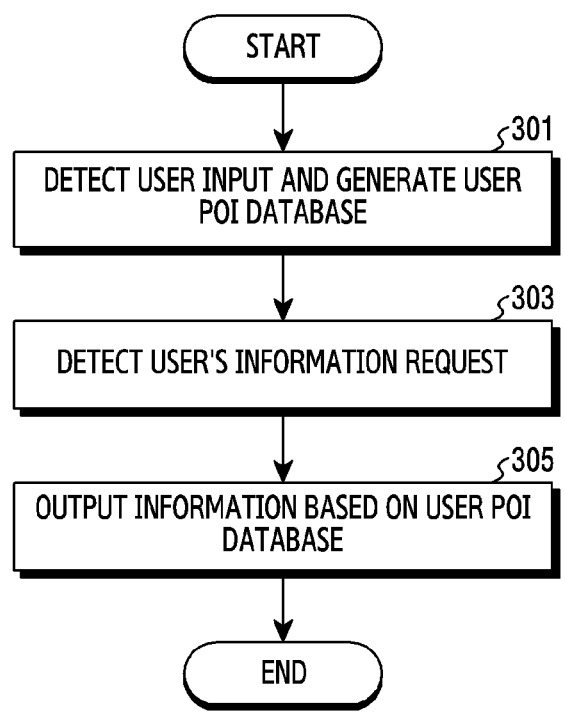
FIG. 3 illustrates a method for providing a location based service in an electronic device according to various embodiments of the present disclosure.

FIG. 3 illustrates a method for providing a location guide service in an electronic device according to various embodiments of the present disclosure. FIG. 3 illustrates an operating method of the electronic device 101.

Referring to FIG. 3, in step 301, the electronic device 101 generates a user POI database. For doing so, the electronic device 101 may determine the user POI, by identifying a user input regarding a POI inputted through an input device, extracting POI related information on a screen displayed by the display 110, or determining a POI corresponding to a current location through location estimation. The electronic device 101 may generate and update the user POI database using the determined user POI. That is, the electronic device 101 may add information of a POI newly discovered to the user POI database. According to one embodiment, the POI database may be generated inside the electronic device 101. In this case, in this step, the electronic device may store the information of the user POI in an internal storage device (e.g., the memory 150). According to another embodiment, the POI database may be generated outside the electronic device 101. In this case, in this step, the electronic device may transmit the information of the user POI to an external server (e.g., a cloud server).

In step 303, the electronic device 101 detects a user's information request. In other words, the electronic device 101 determines that location guide on a specific POI is requested from the user. For example, the user's information request may be defined variously such as a response for accepting route guide in a navigation service, a text input corresponding to the POI on a web site, and a user input for selecting a text indicating the corresponding POI at a place the user does not know while displaying the web page.

In step 305, the electronic device 101 outputs information based on the user POI database. That is, the electronic device 101 may generate guide information (e.g., a text, graphics, etc.) for the location request by the user using at least one user POI of the user POIs. For example, in a navigation service, the electronic device 101 may display a map excluding other user POIs than the user POI. As another example, if the user requests a description on a POI corresponding to an unknown place, the electronic device 101 may generate the description on a specific location or route for the unknown place based on the user POI. In this case, if explaining with a sentence using text or voice, the electronic device 101 may output a guide phrase based on the user POI, or output audio through text-to-sound (TTS).

As described above with reference to FIG. 3, the electronic device 101 may determine the user POI based the user experience, and provide a more convenient location-based service to the user based on the user POI. Herein, as a kind of the location-based service, a service which provides a location description on a specific place may be provided. Specific examples of services for providing the location description on the place are as follows.

According to various embodiments of the present disclosure, if the user finds a place of interest while browsing the web, the electronic device 101 may provide information which describes where the corresponding place is located in association with a place the user knows. For example, the electronic device 101 may output text or speech such as "The corresponding place is located in three minutes walk from 'Aioli' restaurant located in Jongno 1-ga".

According to various embodiments of the present disclosure, the electronic device 101 may receive a short message service (SMS) or an e-mail to meet at a particular place. The electronic device 101 may provide brief information of the corresponding place using user's known places. The electronic device 101 may detect a user's guide request, and output a notification that "You should go by car". The electronic device 101 may also output a notification that "Go to Yongsan 1-ga road" which the user frequently visits. Next, if the user passes through 'Yongsan 1-ga', the electronic device 101 may provide turn-by-turn guide using an image on the map or a voice.

According to various embodiments of the present disclosure, the electronic device 101 may detect that the text indicates a name of the POI. The electronic device 101 may retrieve and recognize the POI name text in the POI database. If the text indicates the POI, the electronic device 101 may determine whether it is one of the user's known POIs. If it is a user's unknown POI, the electronic device 101 may generate a location description, and wait for a user's request.

Operations of the electronic device 101 for the above-described embodiments are described below with reference to FIG. 4.

Figure 4:
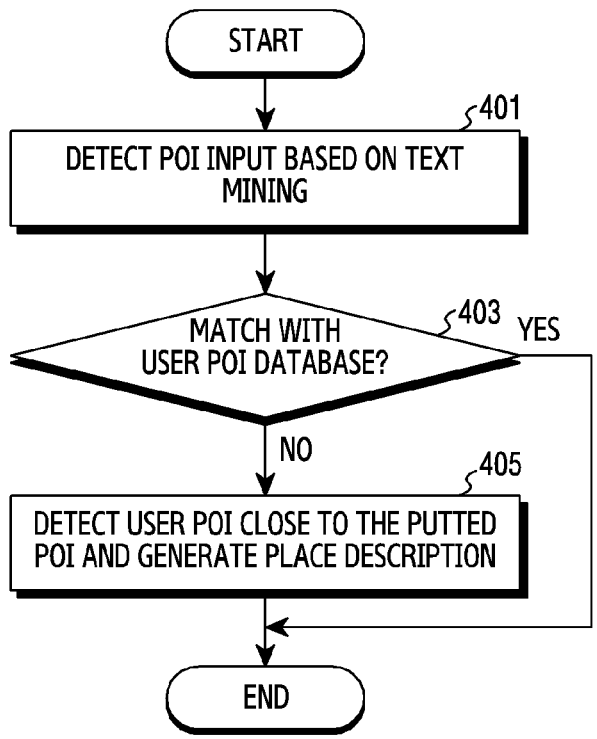
FIG. 4 illustrates a method for providing a place description in an electronic apparatus according to various embodiments of the present disclosure.

FIG. 4 illustrates a method for providing a location description in an electronic apparatus according to various embodiments of the present disclosure. FIG. 4 illustrates an operating method of the electronic device 101.

Referring to FIG. 4, in step 401, the electronic device 101 detects a POI input based on the text mining. That is, if obtaining a text from a user's input, the electronic device 101 may identify whether the obtained text is a text about the POI. For example, if the user is accessing a website, the electronic device 101 may acquire a text displayed on the website using the text mining unit 210, and identify whether it is a text indicating the POI by comparing with a map POI database through the text matching unit 270. In another example, the electronic device 101 may receive at least one e-mail, SMS, long message service (LMS) and multimedia message including contents to meet at a particular place.

In step 403, the electronic device 101 identifies whether the detected POI input and the user POI database match. That is, the electronic device 101 may compare whether a place corresponding to the detected POI is the same as a user's know or visited place. For example, if the detected input matches the user POI database, the electronic device 101 may finish this process for providing the place description because the user already knows or visited the place. If the detected input does not match the user POI database, the electronic device 101 may perform operation 405 for the place description because the user has never visited or knows the place corresponding to the detected POI.

In step 405, the electronic device 101 detects a user POI close to the inputted POI and generates a place description. In other words, to describe the place corresponding to the inputted POI based on the user's known or visited place, the electronic device 101 may detect the user POI close to the inputted POI. In one embodiment, the criterion of the distance for detecting the close user POI may be a distance value which is set by the user of the electronic device 101, or may be a randomly set value. If the set distance value is great, there may be many user POIs close to the inputted POI, and if the set distance value is small, there may be not many user POIs close to the inputted POI. The electronic device 101 may generate the place description based on the detected user POIs. For example, if the inputted user POI is located in 1 Km north from the user POI (e.g., a user's workplace), the electronic device 101 may generate a specific place description that the inputted POI is located in 1 Km north from the user's workplace.

Although not depicted in FIG. 4, the electronic device 101 may display the text differently on the display 110 to induce a request for the location description. For example, if the user is browsing the web, if the POI input detected by the text mining does not match the user POI database, a shadow effect may be displayed together with the text corresponding to the POI, to thus notify the user that a user's unknown place is included in web browsing contents.

According to various embodiments as stated above, the electronic device may provide the description of the specific POI based on the user POI. Thus, the user may understand well the specific POI based on his/her known or visited place. Yet, the electronic device may provide not only the description of the particular POI, but also guide of the navigation route if going to the particular POI. Specific examples of navigation services are as follows.

According to various embodiments of the present disclosure, the electronic device 101 may include information of the user's known place, and display a route from the user's known place to a destination by considering a user's current location. In this case, the route display may be a simple drawing which is drawn by a user's friend to explain the route.

According to various embodiments of the present disclosure, if the user goes to a shopping mall, the user may know well because some area of a route to the corresponding shopping mall is the same as a route to work. In this case, the user may receive an appropriate guide to the destination. The electronic device 101 may provide the guide based on a landmark, or provide guide by the turn-by-turn if there is no landmark. The turn-by-turn navigation guide may be replaced by a landmark image of a close position in another embodiment.

According to various embodiments of the present disclosure, the user may be on the way to a small city which is not shown on a road sign. If the user is completely ignorant of the route, he/she may experience confusion. A navigation application may be aware of the route, the current location and road signs, and accordingly the thus the navigation application may provide a correct city or route on the road sign for the user.

According to various embodiments of the present disclosure, the electronic device 101 may output to the user 'very good or best' for new places in the navigation. In this embodiment, the electronic device 101 may require an additional service considering road traffic status, surroundings, and landmarks other people know. The new landmarks may be completely new places the user has never seen or heard about, may be places the user has heard about or read about, or may be places generally known but unknown to the user. To provide information of the new landmark, if the user is traveling, the electronic device 101 may provide additional information. For example, if the user passes a specific city on a highway, the electronic device 101 may notify some interesting facts such as information that the corresponding city is a landmark on the route, historical fact or recent news.

Operations of the electronic device 101 for the above-described embodiments are explained below with reference to FIG. 5A and FIG. 5B.

Figure 5A:
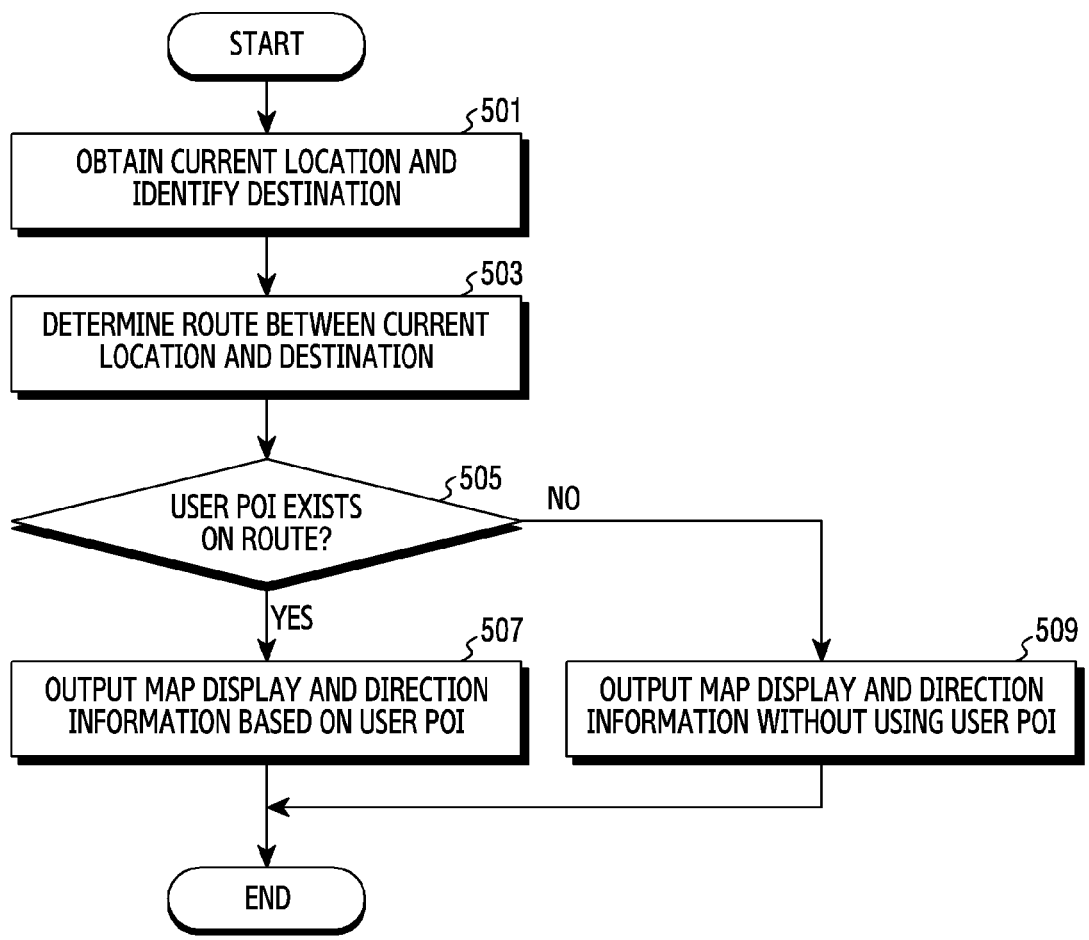
FIG. 5A illustrates a method for providing navigation direction information based on a user point of interest (POI) in an electronic device according to various embodiments of the present disclosure.
Figure 5B:
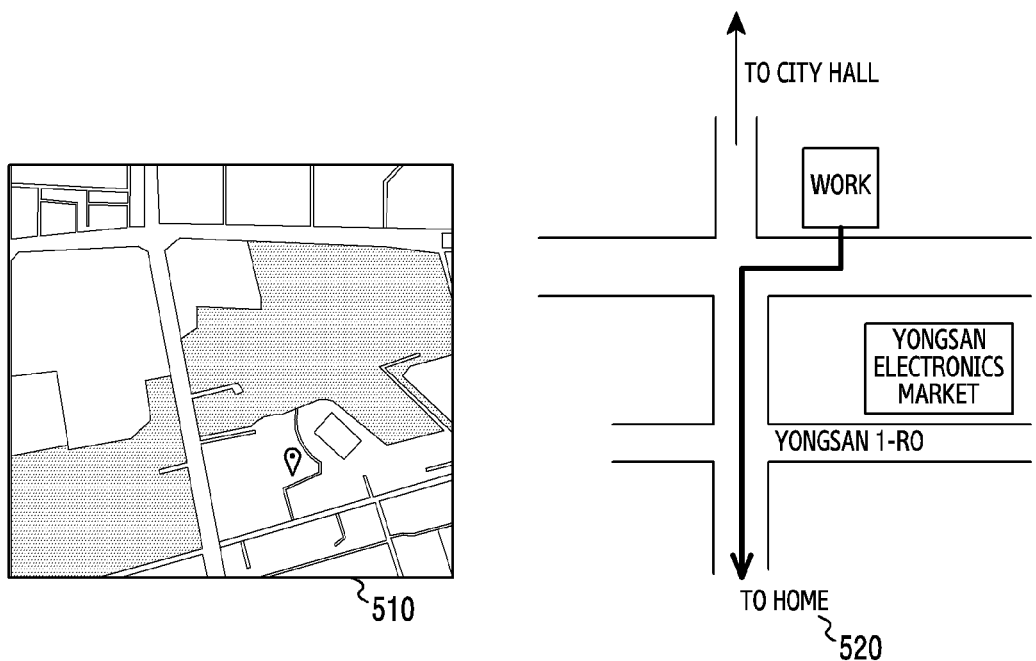
FIG. 5B illustrates an example of map display based on a user POI according to various embodiments of the present disclosure.

FIG. 5A illustrates a method for providing navigation direction information in an electronic device according to various embodiments of the present disclosure. FIG. 5Aa illustrates an operating method of the electronic device 101.

Referring to FIG. 5A, in step 501, the electronic device 101 identifies a current location and a destination. That is, the electronic device 101 may determine POIs for a starting location and an arrival location. For doing so, the electronic device 101 may identify the current location through WiFi monitoring as well as a GPS module or a WPS module, or identify the POI corresponding to the destination inputted through an input device. For example, the electronic device 101 may set the POI corresponding to the identified current location to the starting location, or may set the POI corresponding to the text inputted as the starting location as the starting location. In addition, the electronic device 101 may receive a text input regarding the destination and set a destination POI matching the text in the map POI database as the arrival location.

In step 503, the electronic device 101 determines a route between the current location and the destination. That is, if there is a plurality of routes between the start and the arrival, the electronic device 101 may determine one route. For example, if both of the start and the arrival are POIs of the user's visited places, the electronic device 101 may determine one of the routes stored in the user POI database using the common route detecting unit 290. As another example, if at least one of the start and the arrival is a POI the user has never visited, the electronic device 101 may determine the route using the map POI database 260.

In step 505, the electronic device 101 determines whether a user POI exists on the route. In other words, the electronic device 101 may determine whether a user's known or visited place is present on the determined route. For example, the electronic device 101 may identify all of POIs on the determined route in the map POI database 260. By matching with the user POI database, the electronic device 101 may determine the user POI present on the route. According to another embodiment, the electronic device 101 may determine whether the user POI is present in a particular range from the route.

If the user POI exists on the route, in step 507, the electronic device 101 outputs map display and direction information based on the user POI. That is, the electronic device 101 may output a navigation route guide based on the user's known or visited place. In one embodiment, the electronic device 101 may display the map excluding other POIs than the user POI. Referring to FIG. 5B, the electronic device 101 may output simple map display 520 on the display 110. For example, the user POI may be 'Yongsan Electronics Market', 'work', 'Yongsan 1-ro', 'home' and 'city hall', and the electronic device 101 may display the above-described POI as the map. As another example, the electronic device 101 may output the turn-by-turn guide based on the user POI, wherein the guide may be voice output based on the TTS, image display for the user POI and specific text sentence display.

If the user POI does not exist on the route, in step 509, the electronic device 101 outputs map display and direction information without using the user POI. That is, since there is no user POI on the determined route, the electronic device 101 may output navigation route guide based on the map POI database 260. In one embodiment, the electronic device 101 may display a map including all of POIs. Referring to FIG. 5B, the electronic device 101 may display general map display 510. For example, the user's current location may be displayed in a pin shape, and all other POIs (e.g., buildings, roads, etc.) may be displayed together. As another example, the electronic device 101 may output the turn-by-turn guide based on all the POIs, wherein the guide may be voice output based on the TTS and specific text sentence display.

As described with reference to FIG. 5Aa, the electronic device 101 may provide the navigation route guide based on the user POI. Thus, the user may improve geographical understanding according to the navigation guide using the known or visited place. In addition, the electronic device may output not only the navigation route guide but also the user POI information as the notifications, and thus provide necessary information for the user. Specific examples regarding the notification are as follows.

According to various embodiments of the present disclosure, the electronic device 101 may know other available tram stop at a particular tram stop through automatic user log analysis. Hence, the electronic device 101 may not recommend a tram number to the user, but may recommend the tram stop, and the recommended tram stop may be a familiar stop because the user visits there everyday to work.

According to various embodiments of the present disclosure, from history information based on the user POI database, the electronic device 101 may identify that the user mostly goes for a walk with family in a park. A marathon causing traffic jam may be held in the park on particular Saturday, and the user does not know that. The electronic device 101 may know that the user goes to the park often and a specific road is unavailable at a particular time. Hence, the electronic device 101 may output a notification in advance in morning.

According to various embodiments of the present disclosure, the user may browse a particular product in an Internet shopping mall a few days ago. The electronic device 101 may output that there is a sales event for the corresponding product in a shop very close to the user's workplace. In addition, the user may set a reminder for a notification a few hours or days later.

According to various embodiments of the present disclosure, the electronic device 101 may know a user's known place, and may display a corresponding place, if the user writes an SMS or posts on a social network service (SNS).

In addition, if the user inputs a sentence about the place, the electronic device 101 may recommend names of the user places, and help the user's SNS writing by adding a detailed street address, a link to the map, and so on.

Operations of the electronic device 101 for the embodiments regarding the above-described notification are explained below with reference to FIG. 6 through FIG. 10B.

Figure 6:
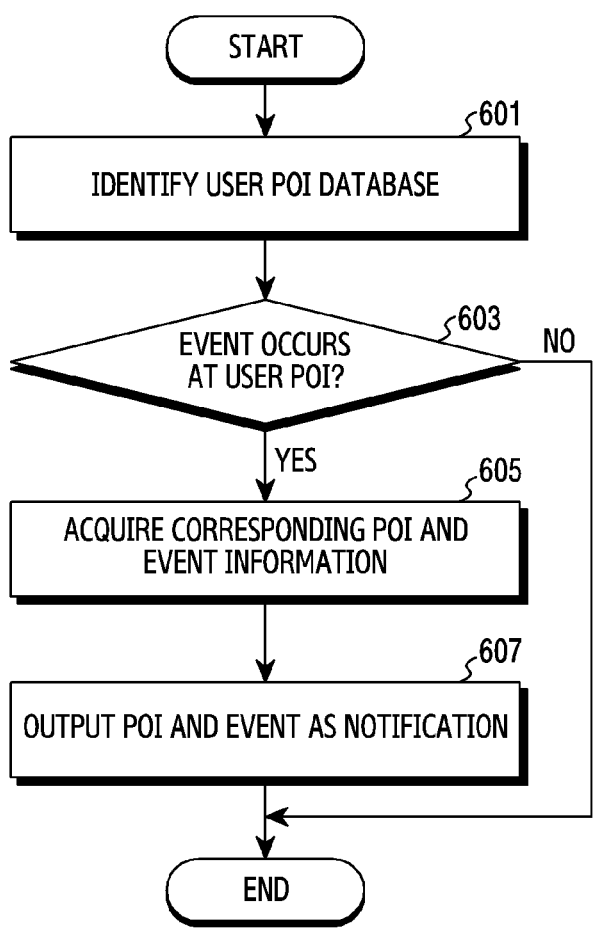
FIG. 6 illustrates a method for providing user POI recommendation information according to various embodiments of the present disclosure.

FIG. 6 illustrates a method for providing user POI recommendation information according to various embodiments of the present disclosure. FIG. 6 illustrates an operating method of the electronic device 101.

Referring to FIG. 6, in step 601, the electronic device 101 identifies the user POI database. That is, the electronic device 101 may identify user's visited or known places.

According to one embodiment, the electronic device 101 may identify a database of a nearby user POI based a current location. In this case, the user POI database may include both of the visited place database 212 and the known place database 214. According to another embodiment, the electronic device 101 may identify a database of the user POI based on a place visited periodically or a place recently searched. Herein, the place visited periodically may be identified through the visited place detecting unit 220 and the visited place matching unit 280, and the place recently searched may be identified through information acquired by the web crawling unit 230, the text mining unit 210 and the text matching unit 270.

In step 603, the electronic device 101 identifies whether an event occurs at the user POI. In other words, the electronic device 101 may detect particular event occurrence of the POI the user has visited or recognized by search. Herein, the event may indicate any information which is significant to the user of the electronic device 101 in relation to the corresponding POI.

In step 605, the electronic device 101 acquires corresponding POI and event information. For example, if identifying the event information that there is a marathon event in the park of every Saturday walk, the electronic device 101 may acquire the corresponding POI information 'Park' and the event Information 'marathon event' together.

In step 607, the electronic device 101 outputs the POI and the event as a notification. For example, if a discount event of a grocery store visited on every Friday ends on Thursday, the electronic device 101 may output a notification before Thursday, and thus the user may learn the POI related event. As another example, if the marathon event occurs at the park visited every Saturday for a walk, the electronic device 101 may output a notification before Saturday, thus notifying the marathon event in advance. In another embodiment, if the user is driving, the electronic device 101 may output a notification based on the TTS rather than the display on the display 110.

Figure 7:
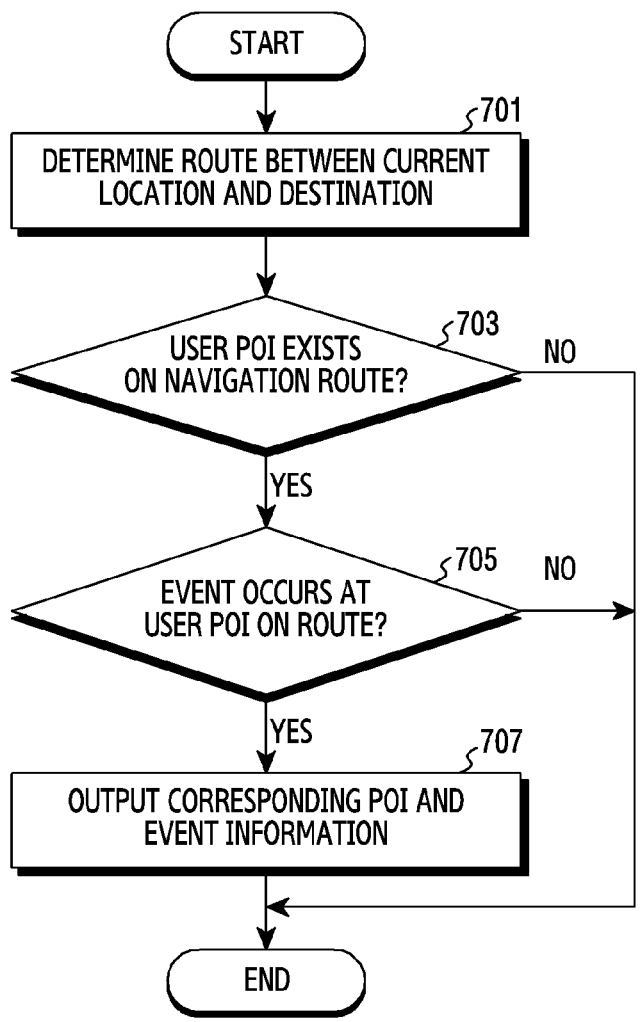
FIG. 7 illustrates a method for providing POI recommendation information on a navigation route according to various embodiments of the present disclosure.

FIG. 7 illustrates a method for providing POI recommendation information on a navigation route according to various embodiments of the present disclosure. FIG. 7 illustrates an operating method of the electronic device 101.

Referring to FIG. 7, in step 701, the electronic device 101 determines a route between a current location and a destination. That is, the electronic device 101 may select a starting point and an arrival point and accordingly determine the route. For example, the electronic device 101 may acquire the current location using the communication unit 140 according to navigation execution, and determine a POI corresponding to the current location as the starting point. In addition, a POI corresponding to a text inputted as the destination may be determined as the arrival point. In one embodiment, if both of the starting point and the arrival point are included in the user POI database, the electronic device 101 may obtain information of the route between the current location and the destination using the common route detecting unit 290. In another embodiment, if the user POI database does not include at least one of the current location and the destination, the electronic device 101 may obtain the route information based on the map POI database 260.

In step 703, the electronic device 101 determines whether the user POI exists on the navigation route. That is, the electronic device 101 may match every POI on the determined route with the user POI database, and determine presence of the user POI on the navigation route if there is a common POI. The electronic device 101 may finish this algorithm if there is no common POI.

In step 705, the electronic device 101 determines whether an event occurs at the user POI on the route. In other words, the electronic device 101 may identify whether information of the common POI is updated. For example, the electronic device 101 may, if there is an update record of a grocery store on the navigation route, determine that the event occurs at the corresponding POI.

In step 707, the electronic device 101 outputs the corresponding POI and event information. For example, the electronic device 101 may display the corresponding POI and the event information on the display 110, and also output through a voice based on the TTS.

Although not depicted, if approaching the POI where the event occurs during the user's driving based on the route guide of the navigation, the electronic device 101 may also output a voice based on the TTS.

Figure 8A:
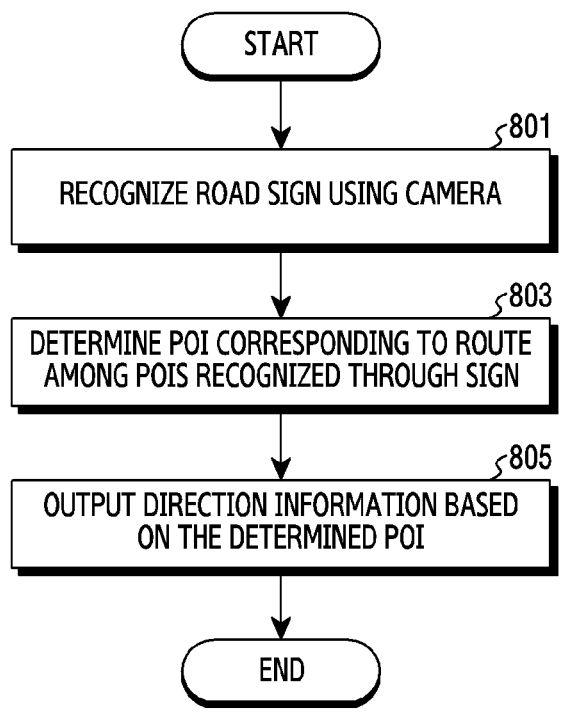
FIG. 8A illustrates a method for providing navigation direction information based on road sign recognition according to various embodiments of the present disclosure.

FIG. 8A illustrates a method for providing navigation direction information based on road sign recognition according to various embodiments of the present disclosure. FIG. 8 illustrates an operating method of the electronic device 101.

Figure 8B:
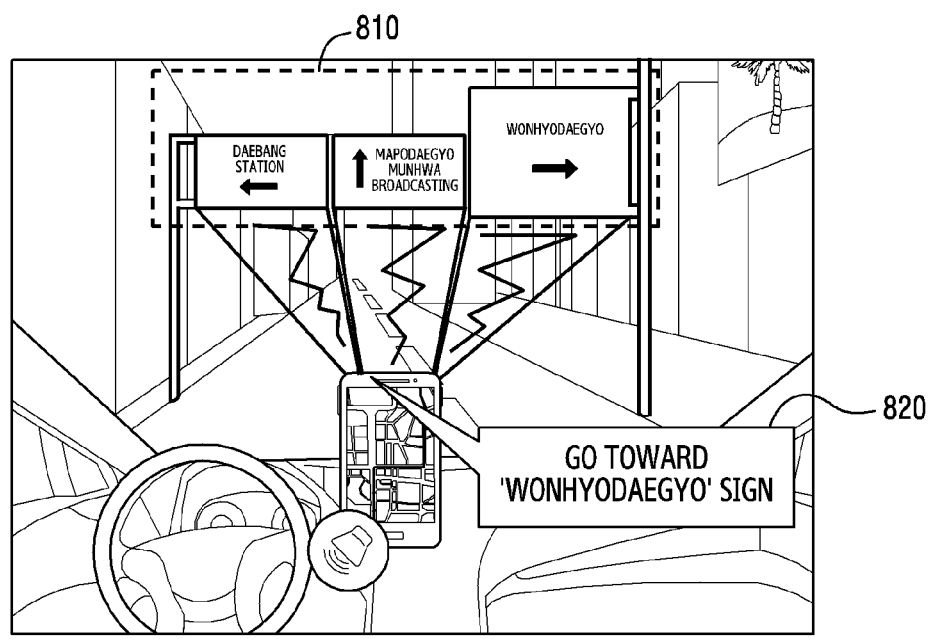
FIG. 8B illustrates an example of providing the navigation direction information based on the road sign recognition according to various embodiments of the present disclosure.

Referring to FIG. 8A, in step 801, the electronic device 101 recognizes a road sign by using the camera 120. That is, the electronic device 101 may identify where a POI indicated by a text of the road sing indicates. For example, if recognizing execution of the navigation, the electronic device 101 may operate a sensor of the camera 120. Next, by processing an image acquired through the camera 120 sensor, the text such as a destination of the road sign may be recognized, and the recognized text may be matched with a POI database (e.g., the map POI database 260 or the user POI database). Referring to FIG. 8B, for example, in a road sign 810, texts acquired may be 'Daebang station', 'Mapodaegyo', 'Munhwa Broadcasting' and 'Wonhyodaegyo'. Next, the electronic device 101 may compare the obtained texts with the map POI database 260 and obtain 'Daebang station', 'Mapodaegyo', 'Munhwa Broadcasting' and 'Wonhyodaegyo' information as the POIs, not the text.

In step 803, the electronic device 101 determines a POI corresponding to the route among the POIs recognized from the sign. That is, the electronic device 101 may select a POI which does not drift away from the determined route among the POIs of the road sign. For example, referring to FIG. 8B, the electronic device 101 may not select 'Daebang station', 'Mapodaegyo' and 'Munhwa Broadcasting' which are the POIs of different directions from the selected route, and may determine 'Wonhyodaegyo' which is the POI of the matching direction.

In step 805, the electronic device 101 outputs direction information based on determined POI. That is, the electronic device 101 may output information for guiding the user toward the determined POI. Herein, the outputted information may be various information such as image, text, and voice. For example, referring to FIG. 8B, the electronic device 101 may output a voice message 820 of "Go toward Wonhyodaegyo sign', or display a sign image for 'Wonhyodaegyo', and may output a text of 'toward Wonhyodaegyo' on the screen.

Figure 9A:
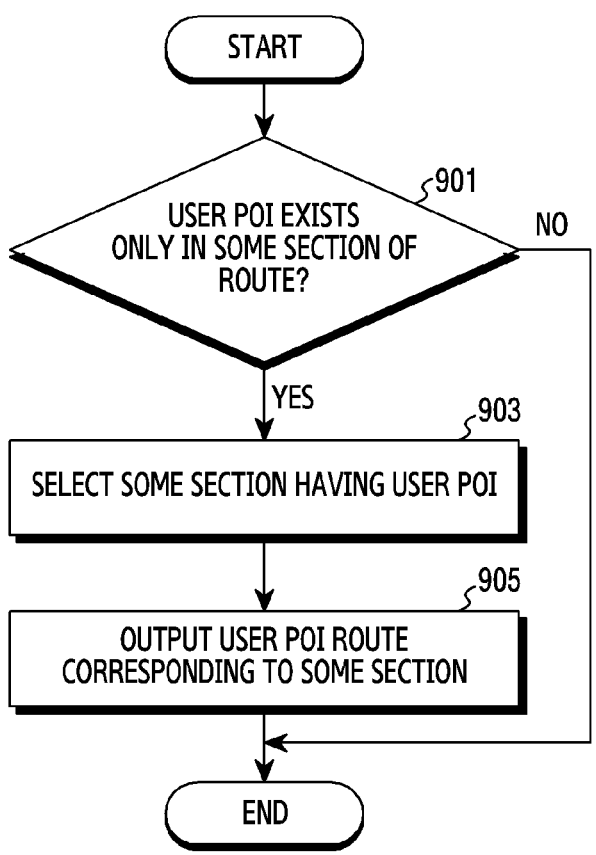
FIG. 9A illustrates a method for providing route information of some section of navigation based on a user POI according to various embodiments of the present disclosure.
Figure 9B:
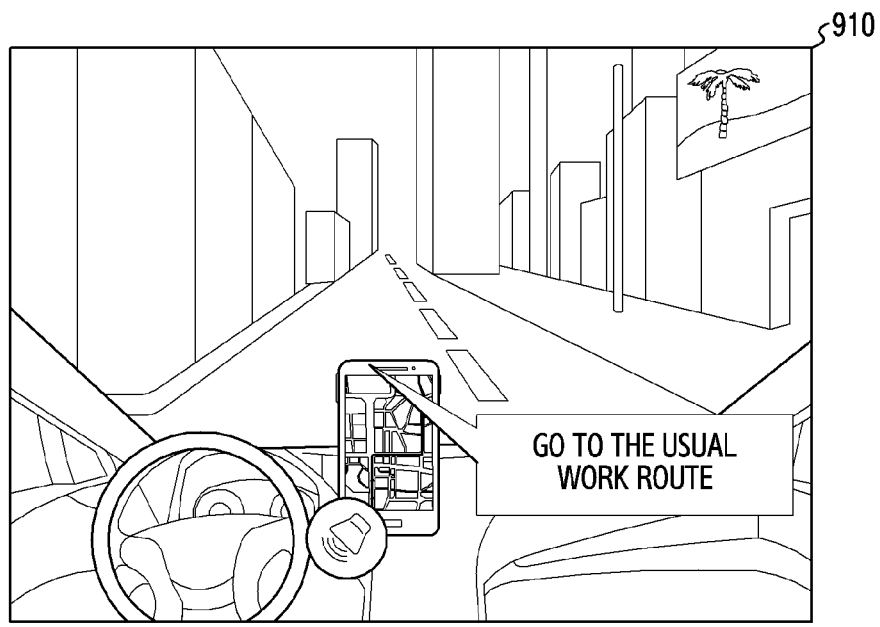
FIG. 9B illustrates an example of providing the route information of the some section of the navigation based on the user POI according to various embodiments of the present disclosure.

FIG. 9A illustrates a method for providing route information of some section of navigation based on a user POI according to various embodiments of the present disclosure. FIG. 9A illustrates an operating method of the electronic device 101.

Referring to FIG. 9A, in step 901, the electronic device 101 determines whether a user POI exists only in some section of a route. That is, the electronic device 101 may identify every user POI on the selected route. If there is no section having the user POI on the selected route, the electronic device 101 may finish this algorithm, and provide route guide based on the map POI database in the entire section of the selected route. By contrast, if there is a section having the user POI on the selected route, the following operation may be performed for the some section route guide based on the user POI.

In step 903, the electronic device 101 selects the some section having the user POI. That is, the electronic device 101 may determine a section for providing the route guide based on the user POI. The electronic device 101 may select the corresponding section if a distance of the user POI exceeds a specific distance. Herein, the specific distance may be a value which is set by the user or an arbitrary value which is set by the processor 160.

In step 905, the electronic device 101 outputs a user POI route corresponding to the some section. That is, the electronic device 101 may provide a navigation route guide based on a user's known or visited place. Herein, the output of the user POI route may be one of voice output for the route guide, image display for the user POI or text display for the route guide. For example, referring to FIG. 9B, some section of the route may be the same as a user's normal work route, and the electronic device 101 may output a voice guide "Go to the usual work route' for the some section.

Figure 10A:
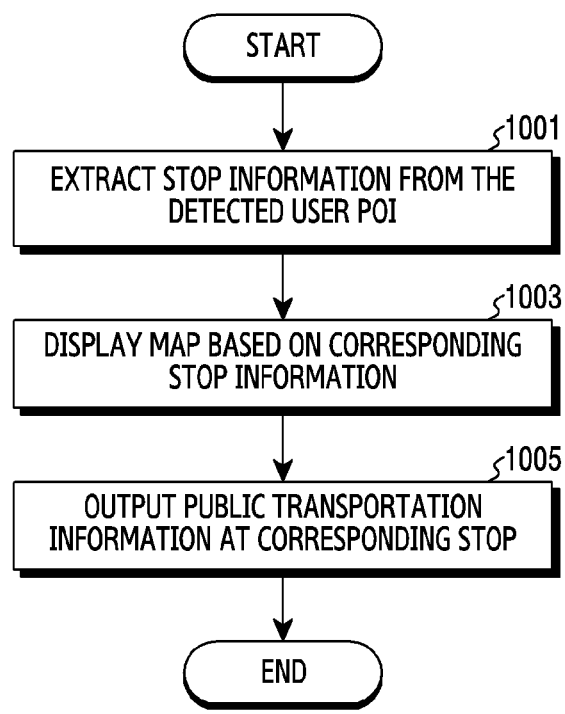
FIG. 10A illustrates a method for providing POI information based on public transportation information according to various embodiments of the present disclosure.
Figure 10B:
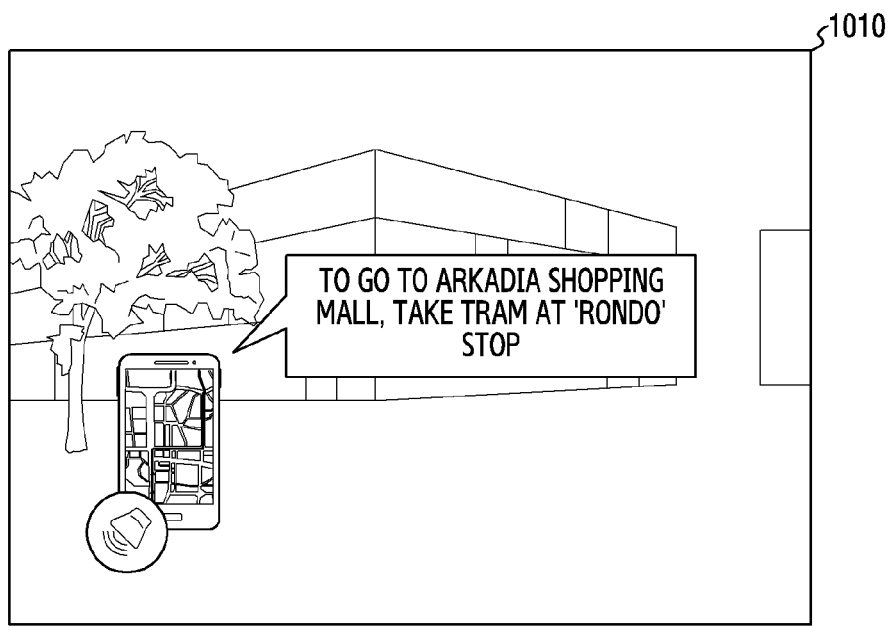
FIG. 10B illustrates an example for providing the POI information based on the public transportation information according to various embodiments of the present disclosure.

FIG. 10A illustrates a method for providing POI information based on public transportation information according to various embodiments of the present disclosure. FIG. 10A illustrates an operating method of the electronic device 101.

Referring to FIG. 10, in step 1001, the electronic device 101 extracts stop information from a detected user POI. The electronic device 101 may select a route from a current location to a destination, wherein the route may refer to a route using both of walking and public transportation. Accordingly, the electronic device 101 may determine a section using the public transportation excluding a walking section, and detect a user POI for the public transportation section. Herein, the user POI for the public transportation section may be stop information such as a subway station, a bus stop, and a tram stop.

In step 1003, the electronic device 101 displays a map based on the corresponding stop information. For example, the electronic device 101 may display the stop information as the map to provide the route using the public transportation. In one embodiment, the electronic device 101 may display the map further including POI information such as a user POI located around the corresponding stop, and a landmark in order to enhance user's understanding.

In step 1005, the electronic device 101 outputs public transportation information at the corresponding stop. For example, if the user arrives at the corresponding stop, the electronic device 101 may further output the public transportation information used to get to the destination. Herein, the public transportation information may be information such as a line number for a bus, subway service information for a subway, and a tram number for a tram. For example, referring to FIG. 10B, the electronic device 101 may know the fact that a stop 'Rondo' is a stop which the user often goes to, and thus output a sound guide such as "To go to Arkadia shopping mall, take tram at 'Rondo' stop".

According to various embodiments described above, the electronic device 101 may provide a location-based service optimized for the user based on the user POI. For the location-based service, the electronic device 101 estimates the location. For the location estimation, a system such as GPS and WPS may be used. Alternatively, for the location estimation, a technique such as time of arrival (TOA) and time difference of arrival (TDOA) using signals of the wireless communication system may be utilized. However, according to various embodiments, the electronic device 101 may continually identify the location, and accordingly the GPS module requires great battery consumption to acquire the location information and the POI of the electronic device 101. In addition, the WPS module, which needs to access a common database, may require Internet connectivity and data exchange.

WiFi monitoring may be suggested to reduce the aforementioned battery consumption and data consumption, and to enhance accuracy and reliability of location measurement. Specific examples of the WiFi monitoring are as follows.

According to various embodiments the present disclosure, the WiFi monitoring may detect a start time and an end time of a visit using a WiFi monitoring unit 1110. The electronic device 101, which is based on the WiFi monitoring, may not rely on Internet connection or data transfer, without using the GPS module and the WPS module. According to one embodiment, if monitoring WiFi for a user's known or visited place, the WiFi monitoring may reduce unnecessary battery consumption by decreasing a sampling interval. In another embodiment, the WiFi monitoring may reduce a sampling frequency based on a motion sensor. If not receiving motion sensing data over a specific time, since there is no need to frequently perform the monitoring to detect a change of the place, the WiFi monitoring may set the sampling frequency to a smaller value. In yet another embodiment, the WiFi monitoring may perform partial wifi scanning. For example, the WiFi monitoring may scan only Wi-Fi corresponding to the user's known or visited place. According to the embodiments mentioned above, the electronic device 101 may reduce unnecessary battery consumption and optimize the battery consumption. In matching the detected place with the POI, the fact that the GPS may not operate all day due to the battery consumption of the GPS and the fact that the GPS does not operate indoors may be problematic. In one embodiment, during a first visit to a specific POI, WiFi connectable a few minutes before the visit may be selected. If the same WiFi is detected next time, GPS log, accelerometer and gyroscope records may be used to determine a user's precise location. Hence, as the number of visits increases, the electronic device 101 may acquire the visit location of higher accuracy through corresponding log records. Thus, if acquiring the visit location of high accuracy, the next visit may not require separate processing.

A configuration and operations of the electronic device 101 for the WiFi monitoring as stated above are described below by referring to FIG. 11A through FIG. 11C.

Figure 11A:
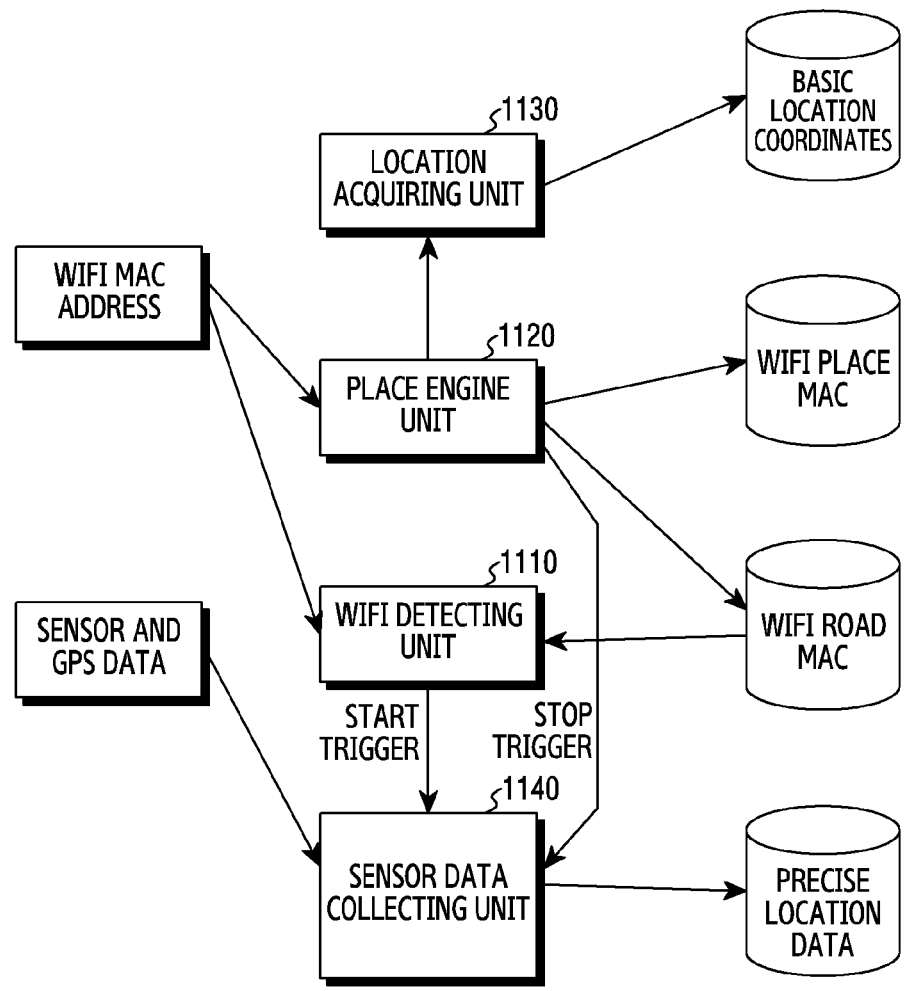
FIG. 11A illustrates a functional configuration of wifi monitoring according to various embodiments of the present disclosure.

FIG. 11A illustrates a functional configuration of WiFi monitoring in an electronic device according to various embodiments of the present disclosure. A term such as 'portion' or '~er' used hereafter indicates a unit for processing at least one function or operation, and may be implemented using hardware, software, or a combination of hardware and software.

Referring to FIG. 11A, for the WiFi monitoring, the electronic device 101 may include a WiFi detecting unit 1110, a place engine unit 1120, a location acquiring unit 1130 and a sensor data collecting unit 1140.

The WiFi detecting unit 1110 may detect a WiFi connectable by the electronic device 101. For example, the WiFi detecting unit 1110 may detect a WiFi for a specific place or WiFi connection for a road. The electronic device 101 may not be connected to a particular Wi-Fi, and may merely store a plurality of connectable WiFis as list information. In one embodiment, if detecting WiFi road media access control (MAC), the WiFi detecting unit 1110 may trigger the sensing data collecting unit 1140.

The place engine unit 1120 may acquire specific place information according to the connected WiFi. For example, each WiFi may include a unique MAC address, and if the WiFi is connected, the place engine unit 1120 may obtain a specific place based on the MAC address of the corresponding WiFi. In another example, if receiving the road WiFi MAC address, the place engine unit 1120 may determine that the user leaves a POI corresponding to an existing visited place. In one embodiment, if detecting a WiFi place MAC, the place engine unit 1120 may stop triggering the sensor data acquiring unit 1140.

The location acquiring unit 1130 may obtain coordinate information according to the place information acquired by the place engine unit 1120. The electronic device 101 may include a database for basic location coordinates corresponding to the place obtained by the place engine unit 1120. Herein, the acquired basic location coordinates may be used to measure a user's precise location with data collected by the sensor data collecting unit 1140, without relying on the GPS module or the WPS module.

The sensor data collecting unit 1140 may collect sensing data such as user's movement of the electronic device 101. Herein, the sensor data collecting unit 1140 may have a configuration similar to the sensor module of FIG. 1. For example, if a WiFi corresponding to a place POI is connected, the sensor data collecting unit 1140 may stop the operation of the sensor module 130 because the user visits the POI. As another example, if a WiFi corresponding to a road POI is connected, the sensor data collecting unit 1140 may operate the sensor module 130 because the user leaves the visited POI. Accordingly, the electronic device 101 may acquire the user's specific location without using the GPS module or the WPS module.

Figure 11B:
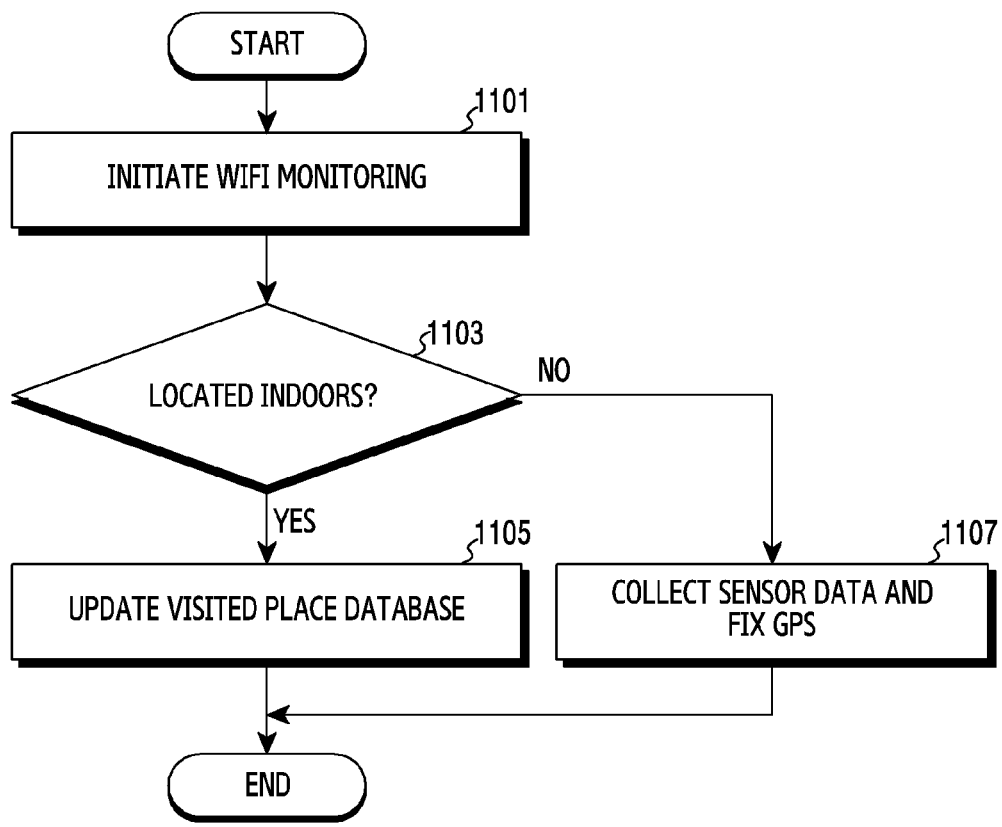
FIG. 11B illustrates a method for conducting the WiFi monitoring according to various embodiments of the present disclosure.
Figure 11C:
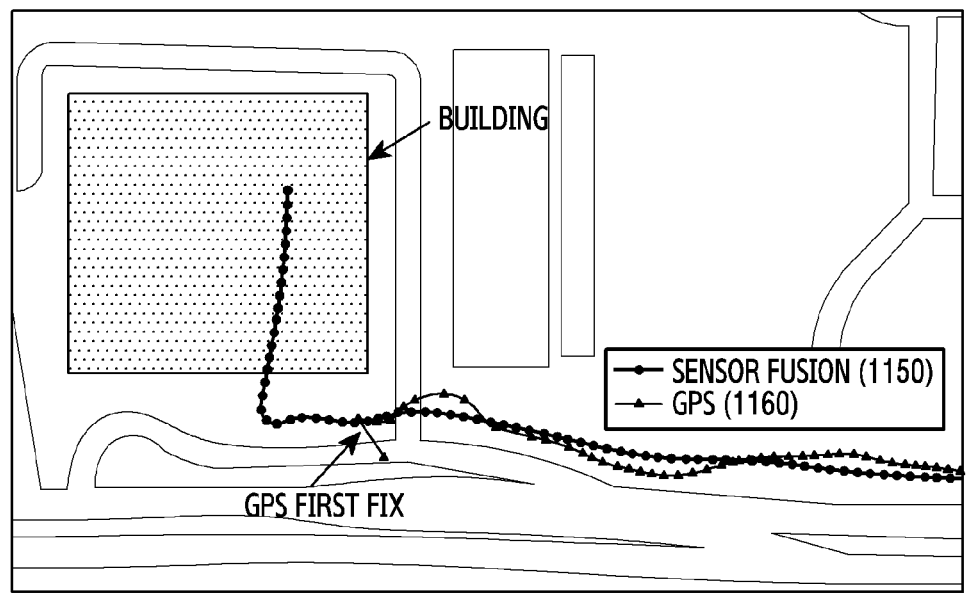
FIG. 11C illustrates a specific example of the WiFi monitoring according to various embodiments of the present disclosure.

FIG. 11B illustrates a method for conducting the WiFi monitoring in the electronic device according to various embodiments of the present disclosure. FIG. 11B illustrates an operating method of the electronic device 101.

Referring to FIG. 11B, in step 1101, the electronic device 101 may initiate the WiFi monitoring. That is, the electronic device 101 may monitor a connectable WiFi. The connectable WiFi may change according to the user's movement, and signal strength of the connectable WiFi may also change. Hence, the electronic device 101 may initiate the WiFi monitoring by monitoring a type and the signal strength of the connectable WiFi in real time.

In step 1103, the electronic device 101 may determine whether the user is located indoors. That is, if acquiring WiFi place MAC, the electronic device 101 may determine that the user is located at a place corresponding to the Wi-Fi place MAC. Herein, the Wi-Fi place MAC indicates a MAC address of a WiFi access point (AP) located indoors. That is, the electronic device 101 may identify the MAC address of the AP using a signal received from the AP, and identify whether the identified MAC address is the WiFi place MAC.

In step 1105, the electronic device 101 may update a visited place database. That is, the electronic device 101 may determine that the user is indoors, and update the database for the POI corresponding to the indoor. Specifically, the electronic device 101 may additionally update the number of visits, and the visit time in the database, and store in the form of a user log record. For example, if the user visits a POI for the first time, the electronic device 101 may add the corresponding POI to the visited place database 212. In addition, if the user re-visits the visited POI, the electronic device 101 may update how many times it is visited and a start time and an end time of the visit in the visited place database 212.

In step 1107, the electronic device 101 may collect sensor data and fix the GPS. In other words, the electronic device 101 may determine that the user is outdoors out of the visited POI, and operate the sensor module 130. For example, upon acquiring the WiFi road MAC, the electronic device 101 may detect a user's movement. However, the electronic device 101 may perform the GPS fix to improve accuracy of the sensor data.

According to various embodiments of the present disclosure, the WiFi monitoring may have very high reliability. The WiFi monitoring may collect GPS, accelerometer and gyroscope logs for a few minutes before the place visit. Based on the collected logs, a precise entrance location of the place may be calculated, and the calculated entrance location may be very important information in acquiring a road address.

According to one embodiment, WPS accuracy may be about 20 m in an urban area, and may be about 70 m in a lower urbanized area. In addition, the accuracy of about 100 m may be obtained in a rural area. Sometimes, the WPS module may provide a location on a next building or on the other road side. If going outside the place, since even walking may cause a considerable gap, time of GPS first fix may be crucial. Referring to FIG. 11C, a user's movement path according to the data collected by the sensor data collecting unit 1140 may be sensor fusion 1150. However, since there may be a difference in time when the user actually leaves the visited POI and time when the sensor data collecting unit 1140 operates according to acquiring the WiFi road MAC using the WiFi monitoring, the electronic device 101 may perform the GPS first fix. Thus, the electronic device 101 may minimize battery consumption and acquire the user's precise location.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of a device. One or more programs may include instructions for enabling the device to execute the methods according to the embodiments disclosed in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method for operating an electronic device, the method comprising:
generating a database comprising a plurality of user points of interest (POIs), wherein each of the plurality of user POIs comprises place information and
location information that indicate at least one place extracted from information inputted to the electronic device;
detecting an information request from a user in a navigation service, wherein the information request comprises a navigation request to a destination;
determining a route between a current location and the destination;
acquiring, using a camera of the electronic device, an image and obtaining, using the database, POIs corresponding to a text recognized from the image;
determining, among the obtained POIs, a POI corresponding to the route; and
outputting direction information for guiding the user toward the determined POI.

2. The method of claim 1, further comprising:
detecting a user input on the electronic device,
wherein the user input comprises a text input based on text mining or a text input for a navigation destination.

3. The method of claim 2, wherein generating the database comprises:
detecting a POI corresponding to a visited place;
checking whether the detected POI is presented in the database; and
if the detected POI is not present in the database, storing the detected POI in the database.

4. The method of claim 3, wherein the user input comprises a text input based on text mining, and the method further comprises:

detecting, in the database, a user POI close to the detected POI;

generating a place description based on the user POI; and outputting the place description.

5. The method of claim 4, wherein the user input comprises a text input for a navigation destination, the method further comprising:
determining the route,
determining whether the user POI of the database exists on the route, and
controlling to output map display and direction information based on the user POI on the route.

6. The method of claim 5, further comprising:
if the database comprises no user POI on the route, controlling to output map display and direction information without using the plurality of user POIs of the database.

7. The method of claim 5, further comprising:
identifying that a user POI of the database exists on the route;
detecting occurrence of an event at the user POI;
obtaining the user POI and information of the event; and
controlling to output the user POI and the information of the event.

8. The method of claim 5, further comprising:
determining whether a user POI of the database exists only in a section of the route, and selecting the section where the user POI exists,
wherein the direction information is direction information based on the user POI which exists in the section.

9. The method of claim 1, further comprising:
identifying a user POI in the database;
detecting occurrence of an event at the user POI;
obtaining the user POI and information of the event; and
outputting the user POI and the information of the event.

10. The method of claim 1, wherein the image corresponds to an image of a road sign.

11. An electronic device comprising:
a processor configured to:
generate a database comprising a plurality of user points (POIs), wherein each of the plurality of user POIs comprises place information and
location information that indicate at least one place extracted from information inputted to the electronic device;
detect an information request from a user in a navigation service, wherein the information request comprises a navigation request to a destination;
determine a route between a current location and the destination;
acquire, using a camera of the electronic device, an image and obtaining, using the database, POIs corresponding to a text recognized from the image; and
determine, among the obtained POIs, a POI corresponding to the route; and
an output unit configured to output direction information for guiding the user toward the determined POI.

12. The electronic device of claim 11, wherein the processor is configured to detect a user input on the electronic device,
wherein the user input comprises a text input based on text mining or a text input for a navigation destination.

13. The electronic device of claim 12, wherein the processor is configured to detect a POI corresponding to a visited place, to check whether the detected POI is present in the database, and if the detected POI is not present in the database, to store the detected POI in the database.

14. The electronic device of claim 13, wherein the user input comprises a text input based on text mining, and
wherein the processor is configured to detect, in the database, a user POI close to the detected POI, to generate a place description based on the user POI, and to control the output unit to output the place description.

15. The electronic device of claim 13, wherein the user input comprises a text input for a navigation destination, and
wherein the processor is configured to determine a navigation route to the navigation destination, to determine whether a user POI of the database exists on the route, and to control the output unit to output map display and direction information based on the user POI on the route.

16. The electronic device of claim 15, wherein the processor is configured to, if the database comprises no user POI on the navigation route, control the output unit to output map display and direction information without using the plurality of user POIs of the database.

17. The electronic device of claim 15, wherein the processor is further configured to identify that a user POI of the database exists on the navigation route, to detect occurrence of an event at the user POI, to obtain the user POI and information of the event, and to control the output unit to output the user POI and the information of the event.

18. The electronic device of claim 15, wherein the processor is configured to determine whether a user POI of the database exists only in a section of the route, and to select the section where the user POI exists, and
the direction information is direction information based on the user POI which exists in the section.

19. The electronic device of claim 11, wherein the processor is configured to identify a user POI in the database, to detect occurrence of an event at the user POI, to obtain the user POI and information of the event, and to control the output unit to output the user POI and the information of the event.

20. The electronic device of claim 11, wherein the image corresponds to an image of a road sign.

* * * * *